April 23, 1935.  K. M. YOST  1,998,647
BRAKE
Filed Oct. 4, 1933
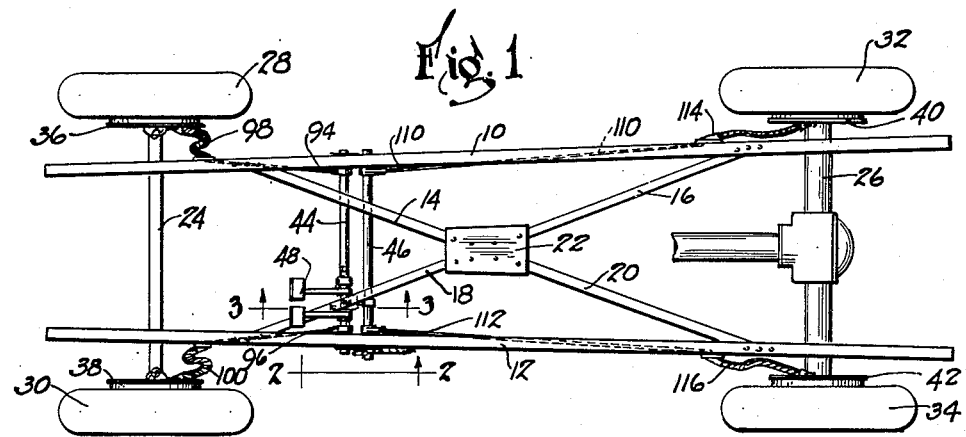
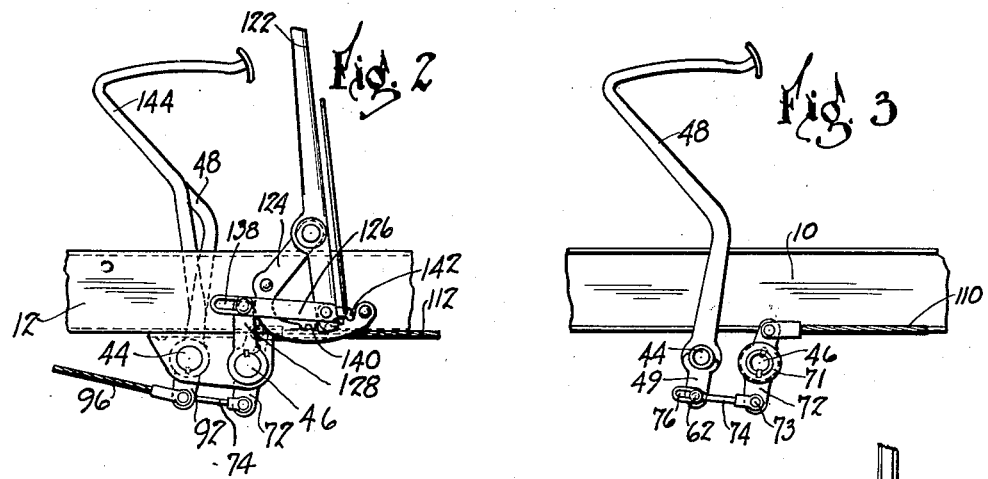
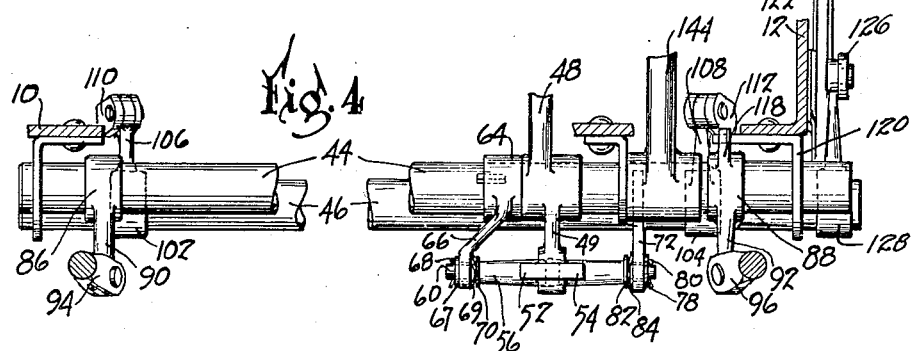
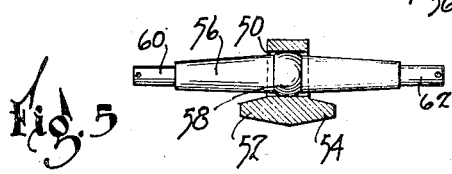
INVENTOR.
Karl M. Yost
BY
Jerome R. Cox
ATTORNEY.

Patented Apr. 23, 1935

1,998,647

UNITED STATES PATENT OFFICE 1,998,647

BRAKE

Karl M. Yost, South Bend, Ind., assignor to Bendix Aviation Corporation, South Bend, Ind., a corporation of Delaware Application October 4, 1933, Serial No. 692,079

2 Claims. (Cl. 188—204)

This invention relates to brakes and operating mechanism therefor, and is illustrated by a cable operated brake system.

One of the objects of the invention is to provide an operating system which will be efficient to apply the brakes under the most adverse conditions. Specifically, the system will be operative even though part of the connections leading to the brakes are broken and also even though some of the brakes are jammed.

Heretofore systems have been designed which were capable of operating efficiently in the event of a happening causing one of these adverse conditions. However, so far as I am aware, never heretofore has provision been made in the same mechanism for the prevention of the adverse results of both occurrences.

One of the features of the invention is the provision of a pair of cross shafts connected by a novel equalizer bar.

A further feature of the invention is an equalizer bar and its connections so designed that the equalizing movement of the bar is limited.

Futher features and objects of the invention should be apparent after a reading of the subjoined specification and claims, and after a consideration of the accompanying drawing, in which:

Figure 1 is a plan view of an automobile equipped with a brake operating system constructed according to my invention;

Figure 2 is a fragmentary view inside elevation taken substantially on the line 2—2 of Figure 1;

Figure 3 is a view in vertical section taken substantially on the line 3—3 of Figure 1;

Figure 4 is a. fragmentary view in front elevation, but with parts in section designed to show the brake operating cross shafts; and Figure 5 is a view in horizontal section of a detail of the equalizer bar and brake operating connections.

Referring particularly to the drawing, I have shown a chassis of an automobile comprising a frame formed of side rails 10 and 12 and X-frame members 14, 16, 18, and 20. The X-frame members are secured to each other by a saddle formed by a pair of plates such as the plate 22. The X-frame members are also secured to the side rails 10 and 12. The frame is supported through front and rear axles 24 and 26 on front road wheels 28 and 30 and on rear road wheels 32 and 34. The front road wheels are provided with drum brakes 36 and 38 and the rear road wheels are provided with drum brakes 40 and 42.

For operating the brakes I provide mechanism including a pair of parallel laterally extending cross shafts 44 and 46 rotatably mounted in bearings in the side frame rails 10 and 12.

The shafts 44 and 46 are adapted to be rotated by a foot pedal 48. This pedal 48 is sleeved for rotation on cross shaft 44 (see Figures 4 and 5) and is provided with a downwardly extending projection 49 formed with a hole 50 and with a pair of laterally extending arms 52 and 54.

Extending through the hole 50 is a short equalizer bar 56 formed at its central portion with a rounded bearing surface 58, and with reduced end portions 60 and 62.

Keyed to the shaft 44 is a hub 64 which has a downwardly extending arm 66. The arm 66 is formed with a hole which is slightly larger than the end 60 of the bar 56. Said end 60 extends through said hole and is secured therein by a washer 67 and cotter pin 68. On the opposite side of the arm 66, a spring 69 is interposed between the arm and a washer 70, which in turn abuts a shoulder formed between the main portion of the bar 56 and the reduced end 60. The spring thus aids in positioning the equalizer bar.

The shaft 46 has keyed thereto a hub 71 formed with a downwardly extending arm 72 pivotally connected at 73 to a link 74. The link 74 is provided at its opposite end with a slot 76 for the purpose of allowing at certain times, a lost motion connection. This slot fits over the end 62 of the bar 56, being fastened thereon by a washer 78 and a cotter pin 80 and held in position by a washer 82 and a spring 84.

Thus it may be seen that force applied to the pedal 48 normally is transmitted through the equalizer bar 56 to transmit equal pressures to rotate the cross shaft 44 and 46 both in a counterclockwise direction (as viewed in Figures 2 and 3). However, should one linkage break, one of the arms 52 and 54 contacts with the bar 56 to insure the application of the uninjured set of brakes.

Means are provided for transmitting to the brakes the force so applied to the cross shafts 44 and 46. A pair of hubs 86 and 88 having downwardly extending arms 90 and 92, are secured to the shaft 44. Connected to the lower ends of the arms 90 and 92 are tension connections 94 and 96 extending forward to the brakes 36 and 38 and passing adjacent their forward ends through the conduits 98 and 100. Similarly, the shaft 46 has keyed thereto a pair of hubs 102 and 104 having respectively upwardly extending arms 106 and 108, to the ends of which are connected rearwardly extending tension elements 110 and 112. The tension elements extend rearwardly to the brakes 40 and 42 passing adjacent to their rearward ends through conduits 114 and 116.

The hub 88 also has formed therewith an upwardly extending projection 118 which is adapted to contact with a stop member 120 secured to the side rail 12. The projection 118 thus serves to limit the return movement of the cross shaft 44.

Means are provided for applying the rear brakes independently of the front brakes and independently of the pedal 48. A hand lever 122 is pivoted on a bracket 124 secured to the side rail 12. The lever 122 is connected by a pivoted link 126 with an arm 128 keyed to the cross shaft 46. A slot 138 in the link 126 allows the operation of all of the brakes by the pedal without movement of the hand lever. Similarly, the slot 76 in the end of the link 74 allows the rotation of the shaft 46 and the application of the rear brakes without movement of the shaft 44 or the pedal 48.

The bracket 124 is provided with teeth 140 with which a pawl 142 pivoted on the lever 122 coacts to releasably hold the lever 122 in any desired position.

As noted above, the projection 118 coacts with the stop member 120 to limit the return movement of the cross shaft 44. The arm 128 coacts with the slot 138 to limit the return movement of the shaft 46.

A clutch pedal 144 is mounted on the shaft 44, but is not material to the brake operation described.

It is believed that the operation of the brake operating system will be readily understood as previously described. Movement of the pedal 48 operates to apply equal forces to rotate shafts 44 and 46. These forces are transmitted through the arms 90, 92, 106, and 108 and tension connections 94, 96, 110, and 112 to the brakes 36, 38, 40, and 42. Force applied to the hand lever 122 acts through the link 126, the arm 128, the cross shaft 46, the tension connections 110 and 112 to operate the rear brakes 40 and 42.

It may be thus seen that I have provided an efficient brake operating system. Normally, all of the brakes are operated by the pedal 48 and the front and rear systems are equalized through the bar 56. Should any brake jam for any cause, nevertheless the operator could, through the pedal, operate the front brakes or the rear brakes. Moreover, should any connection break, the arms 52 and 54 insure that the other set of brakes may be operated through the pedal. In addition, the rear brakes may be operated entirely independently through the hand lever 122.

It is to be understood that the above described embodiments of my invention are for the purpose of illustration only and various changes may be made therein without departing from the spirit and scope of my invention.

I claim:

1. A brake system comprising a pair of separate sets of brakes, a first cross shaft, a second cross shaft, a pedal pivoted on said first cross shaft and provided with an extension, an equalizer bar pivoted on the extension, a hub secured to the first cross shaft, an arm on the hub connected to one end of the equalizer bar, a connection between the other end of the equalizer and the second shaft, means for transmitting brake applying force from said first shaft to one of said sets of brakes, means for transmitting force from said second shaft to the other set of brakes, and a hand lever connected to said second shaft.

2. A brake system comprising a pair of separate sets of brakes, a first cross shaft, a second cross shaft, a pedal pivoted on said first cross shaft and provided with an extension, an equalizer bar pivoted on the extension, a hub secured to the first cross shaft, an arm on the hub connected to one end of the equalizer bar, a connection between the other end of the equalizer and the second shaft, means for transmitting brake applying force from said first shaft to one of said sets of brakes, and means for transmitting force from said second shaft to the other set of brakes.

KARL M. YOST.